US012789740B2

(12) United States Patent
Usami

(10) Patent No.: US 12,789,740 B2
(45) Date of Patent: Nov. 10, 2026

(54) VEHICLE SEAT

(71) Applicant: TS TECH CO., LTD., Asaka (JP)

(72) Inventor: Hideki Usami, Shioya-gun (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 19/346,983

(22) Filed: Oct. 1, 2025

(65) Prior Publication Data

US 2026/0021784 A1 Jan. 22, 2026

Related U.S. Application Data

(60) Continuation of application No. 18/951,319, filed on Nov. 18, 2024, now Pat. No. 12,454,238, which is a (Continued)

(30) Foreign Application Priority Data

Aug. 7, 2017 (JP) ................................ 2017-152508
Aug. 7, 2017 (JP) ................................ 2017-152514

(Continued)

(51) Int. Cl.
*B60R 21/207* (2006.01)
*B60N 2/68* (2006.01)

(Continued)

(52) U.S. Cl.
CPC .............. *B60R 21/207* (2013.01); *B60N 2/68* (2013.01); *B60R 21/2165* (2013.01); *B60R 21/217* (2013.01); *B60R 2021/0032* (2013.01)

(58) Field of Classification Search
CPC .................... B60R 2021/23153; B60R 21/207
See application file for complete search history.

(56) References Cited

U.S. PATENT DOCUMENTS 3,514,124 A 5/1970 Richardson
5,588,670 A 12/1996 Storey (Continued)

FOREIGN PATENT DOCUMENTS

CN 101028810 B 5/2011
CN 101049815 B 11/2011

(Continued)

OTHER PUBLICATIONS

International Search Report for PCT/JP2018/014053 dated May 31, 2018, 2 pages.

(Continued)

*Primary Examiner* — Nicole T Verley
(74) *Attorney, Agent, or Firm* — Dority & Manning, P.A.

(57) ABSTRACT

To reduce an amount of rear protrusion of a vehicle seat equipped with an airbag module configured to deploy rearward, in a vehicle seat provided with a seat cushion and a seat back, the seat back includes: a seat back frame including a pair of left and right side frames extending in a vertical direction and an upper frame connecting upper ends of the side frames to each other; an airbag module supported by an upper half of the seat back frame via a bracket; and a skin member covering the seat back frame, the bracket, and the airbag module from a rear side thereof, wherein a part of the skin member corresponding to the airbag module is provided with a frangible portion configured to open upon inflation of an airbag.

20 Claims, 10 Drawing Sheets

Related U.S. Application Data continuation of application No. 18/501,378, filed on Nov. 3, 2023, now Pat. No. 12,172,594, which is a division of application No. 17/748,375, filed on May 19, 2022, now Pat. No. 11,840,189, which is a continuation of application No. 16/636,942, filed as application No. PCT/JP2018/014053 on Apr. 2, 2018, now Pat. No. 11,358,552.

(30) Foreign Application Priority Data

Aug. 7, 2017 (JP) ................................ 2017-152522
Aug. 7, 2017 (JP) ................................ 2017-152525

(51) Int. Cl.

*B60R 21/2165* (2011.01)
*B60R 21/217* (2011.01)
*B60R 21/00* (2006.01)

(56) References Cited

U.S. PATENT DOCUMENTS

| | | | |
|---|---|---|---|
| 5,975,565 | A | 11/1999 | Cuevas |
| 6,199,900 | B1 | 3/2001 | Zeigler |
| 9,586,552 | B1 | 3/2017 | Whitens et al. |
| 9,707,873 | B2 | 7/2017 | Line |
| 10,035,434 | B2 | 7/2018 | Ohno et al. |
| 10,189,430 | B2 | 1/2019 | Nagasawa |
| 10,272,868 | B2 | 4/2019 | Jaradi |
| 10,596,936 | B2 | 3/2020 | Sikorski |
| 10,703,319 | B2 | 7/2020 | Schneider |
| 10,814,823 | B2 | 10/2020 | Jaradi |
| 11,034,323 | B2 | 6/2021 | Farooq |
| 11,097,681 | B2 | 8/2021 | Zauritz |
| 11,958,428 | B2 | 4/2024 | Shimizu et al. |
| 2010/0164204 | A1 | 7/2010 | Sugimoto et al. |
| 2013/0341975 | A1 | 12/2013 | Schneider et al. |
| 2016/0347218 | A1 | 12/2016 | Akaike et al. |
| 2017/0361800 | A1 | 12/2017 | Ohachi |
| 2018/0111526 | A1 | 4/2018 | Okimura et al. |
| 2018/0186325 | A1 | 7/2018 | Jaradi |
| 2018/0319358 | A1 | 11/2018 | Schneider |
| 2019/0047503 | A1 | 2/2019 | Faruque |
| 2019/0168703 | A1 | 6/2019 | Sato |
| 2019/0241102 | A1 | 8/2019 | Okimura et al. |
| 2019/0263346 | A1 | 8/2019 | Schneider |
| 2020/0114790 | A1 | 4/2020 | Okimura et al. |
| 2020/0331418 | A1 | 10/2020 | Fredriksson |
| 2021/0094503 | A1 | 4/2021 | Farooq |
| 2021/0323497 | A1 | 10/2021 | Yamada |
| 2022/0073026 | A1 | 3/2022 | Ohno et al. |
| 2022/0126733 | A1 | 4/2022 | Okimura et al. |

FOREIGN PATENT DOCUMENTS

| | | | | |
|---|---|---|---|---|
| CN | 107891835 | | 4/2018 | |
| CN | 114228658 | A * | 3/2022 | ........... B60R 21/217 |
| CN | 114228658 | B | 9/2024 | |
| DE | 19540911 | | 5/1997 | |
| DE | 102014012446 | | 4/2015 | |
| DE | 102015109180 | | 12/2016 | |
| DE | 102016008386 | | 1/2018 | |
| JP | H 04-348712 | A | 12/1992 | |
| JP | H0687060 | | 12/1994 | |
| JP | 2007185981 | | 7/2007 | |
| JP | 2010-184668 | A | 8/2010 | |
| JP | 2013100045 | | 5/2013 | |
| JP | 2013-193491 | A | 9/2013 | |
| JP | 2014189062 | | 10/2014 | |
| JP | 2015209081 | | 11/2015 | |
| JP | 2016-013786 | A | 1/2016 | |
| JP | 2016203946 | | 12/2016 | |
| JP | 2016216001 | | 12/2016 | |
| JP | 2017088159 | A | 5/2017 | |
| JP | 2019031156 | | 2/2019 | |
| JP | 2019031165 | | 2/2019 | |
| JP | 2019031166 | | 2/2019 | |
| JP | 6477816 | | 3/2019 | |
| JP | 2019085030 | | 6/2019 | |
| JP | 2019182113 | | 10/2019 | |
| JP | 2022045834 | A | 3/2022 | |
| KR | 0173656 | | 2/1999 | |
| KR | 100315567 | | 11/2001 | |
| KR | 20120025251 | | 3/2012 | |
| RU | 2650174 | | 4/2018 | |
| WO | WO2016010012 | | 1/2016 | |
| WO | WO2016053460 | | 4/2016 | |
| WO | WO2017002764 | A1 | 1/2017 | |
| WO | WO2017022678 | | 2/2017 | |
| WO | WO2019031164 | | 2/2019 | |
| WO | WO2019194197 | | 10/2019 | |

OTHER PUBLICATIONS

Japanese Office Action (with English translation) for corresponding Japanese Patent Application No. 2017-152508, dated Jul. 20, 2021—10 pages.

Office Action (with English translation) received in corresponding Application No. 2021-133913, dated Apr. 7, 2023, 10 pages.

Non-Final Office Action for corresponding U.S. Appl. No. 16/636,942, dated Oct. 28, 2021, 13 pages.

Non-Final Office Action for corresponding U.S. Appl. No. 17/748,375, dated Jan. 17, 2023, 8 pages.

Notice of Allowance for corresponding U.S. Appl. No. 16/636,942, mailed Feb. 16, 2022, 5 pages.

Notice of Allowance for corresponding U.S. Appl. No. 17/748,375, mailed Aug. 4, 2023, 10 pages.

Non-Final Office Action for corresponding U.S. Appl. No. 18/951,319, mailed on Mar. 27, 2025, 5 pages.

Notice of Allowance for corresponding U.S. Appl. No. 18/951,319, mailed on Jul. 22, 2025, 5 pages.

Japanese Office Action (w/English translation) for corresponding Application No. 2024-164113, dated Dec. 23, 2025, 8 pages.

* cited by examiner 28
23
25
21
66
12
8
68
75
70
78
22
34
83
24
9
65
41
40
72
55
32
81
60
71
53
69
80
58
42
43
59
47
69
49
56
52
76
69
45
50
51
46
48
57
79
33
36
31
11
82
84

VEHICLE SEAT

CROSS REFERENCE TO RELATED APPLICATIONS

This application is a continuation of U.S. patent application Ser. No. 18/951,319, filed on Nov. 18, 2024, which is a continuation of U.S. patent application Ser. No. 18/501,378, filed on Nov. 3, 2023 (now U.S. Pat. No. 12,172,594, issued on Dec. 24, 2024), which is a divisional of U.S. patent application Ser. No. 17/748,375, filed on May 19, 2022 (now U.S. Pat. No. 11,840,189, issued on Dec. 12, 2023), which is a continuation of U.S. patent application Ser. No. 16/636,942, filed on Feb. 6, 2020 (now U.S. Pat. No. 11,358,552, issued on Jun. 14, 2022), which is the U.S. National Stage entry of International Application No. PCT/JP2018/014053, filed on Apr. 2, 2018, which claims priority to Japanese Patent Application No. 2017-152508, filed on Aug. 7, 2017; Japanese Patent Application No. 2017-152514, filed on Aug. 7, 2017; Japanese Patent Application No. 2017-152522, filed on Aug. 7, 2017; and Japanese Patent Application No. 2017-152525, filed on Aug. 7, 2017, all of which are incorporated herein by reference in their entireties for all purposes.

TECHNICAL FIELD

The present invention relates to a front vehicle seat equipped with an airbag.

BACKGROUND ART

In some vehicles, a front vehicle seat is equipped with an airbag module configured to deploy rearward (see Patent Document 1, for example). In such a vehicle seat, the airbag module is mounted on the rear face of the seat back such that, at the time of a frontal collision, the airbag that deploys rearward protects an occupant seated in the rear seat.

PRIOR ART DOCUMENT(S)

Patent Document(s)

Patent Document 1: JPH06-87060U

SUMMARY OF THE INVENTION

Task to be Accomplished by the Invention

There is a problem that the airbag module protrudes rearward of the seat back, and hence, it is difficult to ensure a space between the front seat and the rear seat.

In view of the above background, an object of the present invention is to provide a vehicle seat in which an airbag module configured to deploy rearward is installed and the airbag module is housed in the seat back.

Means to Accomplish the Task

To achieve the above object, there is provided a vehicle seat (1) provided with a seat cushion (3) and a seat back (4), wherein the seat back comprises: a seat back frame (7) including a pair of left and right side frames (11) extending in a vertical direction and an upper frame (12) connecting upper ends of the side frames to each other; an airbag module (43) supported by an upper half of the seat back frame via a bracket (31); and a skin member (9) covering the seat back frame, the bracket, and the airbag module from a rear side thereof, and wherein a part of the skin member corresponding to the airbag module is provided with a frangible portion (80) configured to open upon inflation of an airbag (45).

According to this aspect, the airbag module is covered by the skin member covering the seat back frame, and therefore, it is possible to house airbag module in the seat back. Further, since the skin member covering the airbag module from the rear side is formed with a frangible portion, the airbag is allowed to deploy rearward.

In the above aspect, preferably, the airbag module is located at a position below the upper frame and overlapping with the side frames in side view.

According to this aspect, since the airbag module is located at a position overlapping with the side frames in side view, the amount of rearward protrusion of the seat back can be reduced.

In the above aspect, preferably, the bracket is located more rearward than a headrest pillar (28).

According to this aspect, the bracket can be provided without changing the position of the headrest pillar.

In the above aspect, preferably, the bracket consists of a plate member defining a recess (41) for housing the airbag module, and a bottom wall (42) of the recess has a flat plate-like shape inclined rearward in a downward direction with respect to an axial direction of the headrest pillar.

According to this aspect, since the bottom wall of the recess formed in the bracket is inclined rearward from up to down, discomfort felt in the back of the seated occupant due to the bracket can be reduced.

In the above aspect, preferably, the bracket is joined to the upper frame at an upper edge thereof and is joined to the respective side frames at left and right edges thereof.

According to this aspect, the bracket can support the airbag module against the load caused by deployment of the airbag.

In the above aspect, preferably, a lower edge of the bracket is provided with a rim wall (36) that protrudes forward, and the bracket is joined to the side frames at a part of the bracket between the rim wall and a lower end of the recess with respect to a vertical direction.

According to this aspect, it is possible to increase the stiffness of the bracket. Because the side frames are joined to each other via the bracket having high stiffness, the stiffness of the seat back frame as a whole can be increased.

In the above aspect, preferably, an upper edge of the bracket is provided with a pair of upper tongues (34) protruding in a laterally spaced relationship, and upper ends of the upper tongues are joined to the upper frame.

According to this aspect, the joint between the bracket and the upper frame becomes more firm.

In the above aspect, preferably, the bottom wall of the recess is formed with a through-hole (51) and the airbag module is fastened to the bottom wall by a fastener (50) passed through the through-hole.

According to this aspect, the bottom wall of the recess can support the forward load applied to the bracket upon deployment of the airbag.

In the above aspect, preferably, a lower side wall of the recess is formed with a through-hole (51) and the airbag module is fastened to the lower side wall of the recess via a fastener (50) passed through the through-hole.

According to this aspect, the fastener does not protrude forward, and discomfort felt in the back of the seated occupant can be reduced.

In the above aspect, preferably, the bracket is located above a pressure receiving member (17) configured to support a back of an occupant.

According to this aspect, it is possible to prevent the bracket from causing discomfort felt in the back of the occupant.

In the above aspect, preferably, a blower (56) for blowing air is provided on a front face of the bracket.

According to this aspect, it is unnecessary to provide a bracket for supporting the blower within the vehicle seat, whereby the vehicle seat can be simplified.

In the above aspect, preferably, the airbag module includes the airbag, an inflator disposed below the airbag and configured to inflate the airbag, and a retainer that houses the airbag and the inflator and opens rearward, the retainer includes a guide wall that opposes the inflator at a position above the airbag and faces downward, and the airbag is guided by the guide wall to inflate rearward.

According to this aspect, the guide wall can guide the airbag to inflate rearward, whereby it is possible to make the airbag deploy to the rear of the seat back.

In the above aspect, preferably, the frangible portion is located substantially behind the guide wall.

According to this aspect, the airbag is guided by the guide wall to inflate toward the frangible portion, whereby a load is likely to be applied to the seam. In the above aspect, preferably, at least a part of the frangible portion overlaps with the bracket in rear view and the airbag module is provided on a rear face of the bracket.

According to this aspect, because the frangible portion overlaps with the bracket in rear view, the airbag can pass the frangible portion easily, and thus, the airbag can easily deploy to the rear of the seat back. Further, at the time of airbag deployment or when the occupant seated in the rear seat collides with the airbag, the airbag module can be supported by the bracket.

In the above aspect, preferably, the frangible portion extends laterally, and at least one of a first stay cloth having a base end joined to the bracket at a position above the airbag module in side view and a free end joined to a vicinity of a part of the skin member above the frangible portion and a second stay cloth having a base end joined to the bracket at a position below the airbag module in side view and a free end joined to a vicinity of a part of the skin member below the frangible portion is provided.

According to this aspect, the airbag module is covered by the skin member together with the seat back frame, and the airbag module is accommodated inside the seat back. In addition, at least one of the first stay cloth and the second stay cloth transmits the load caused by the inflation of the airbag to the frangible portion so that the frangible portion opens, whereby the airbag is allowed to deploy to the rear of the seat back through the frangible portion.

In the above aspect, preferably, a pad member provided at a rear of the airbag module is located between the airbag module and the skin member, and the pad member is provided with a first slit (71) extending from a rear of a deployment port of the airbag module to a front of the frangible portion.

According to this aspect, it is possible to make the airbag deploy to the rear of the seat back. Since the airbag module can be covered by the pad member, the touch feeling of the rear face of the vehicle seat is improved.

In the above aspect, preferably, the pad member is provided with a second slit (72) extending from a rear of a joint between the bracket and the base end of the first stay cloth to the front of the frangible portion such that the first stay cloth is passed therethrough.

According to this aspect, the length of the first stay cloth in the fore-and-aft direction can be reduced, and therefore, the load applied to the first stay cloth is easily transmitted to the frangible portion and this facilitates the opening of the frangible portion.

In the above aspect, preferably, the second stay cloth extends along a lower edge and a rear edge of the pad member to reach a vicinity of the part below the frangible portion.

According to this aspect, the second stay cloth can be attached easily.

In the above aspect, preferably, the bracket is in a plate-like shape having a main surface facing rearward and includes a rim wall (36) protruding forward at a lower edge thereof, and a hooking member (84) hooked by the rim wall is joined to the base end of the second stay cloth.

According to this aspect, the second stay cloth can be joined to the bracket easily.

In the above aspect, preferably, the bracket includes an engagement portion (55) above the airbag module, and an engaged member (83) engaged by the engagement portion is joined to the base end of the first stay cloth.

According to this aspect, the first stay cloth can be joined to the bracket easily.

Effects of the Invention

According to the foregoing aspects, it is possible to provide a vehicle seat in which an airbag module configured to deploy rearward is installed and the airbag module is housed in the seat back.

Also, according to the aspect wherein the airbag module is located at a position overlapping with the side frames in side view, the amount of rearward protrusion of the seat back can be reduced.

Also, according to the aspect wherein the bracket is located more rearward than a headrest pillar, the bracket can be provided without changing the position of the headrest pillar.

Also, according to the aspect wherein the bottom wall of the recess formed in the bracket is inclined rearward from up to down, discomfort felt in the back of the seated occupant due to the bracket can be reduced.

Also, according to the aspect wherein the bracket is joined to the upper frame at an upper edge thereof and is joined to the respective side frames at left and right edges thereof, the bracket can support the airbag module against the load caused by deployment of the airbag.

Also, according to the aspect wherein a lower edge of the bracket is provided with a rim wall that protrudes forward, it is possible to increase the stiffness of the bracket. Because the side frames are joined to each other via the bracket having high stiffness, the stiffness of the seat back frame as a whole can be increased.

Also, according to the aspect wherein upper ends of the pair of upper tongues provided on the bracket are joined to the upper frame, the joint between the bracket and the upper frame becomes more firm.

Also, according to the aspect wherein the bottom wall of the recess is formed with a through-hole and the airbag module is fastened to the bottom wall by a fastener passed through the through-hole, the bottom wall of the recess can support the forward load applied upon deployment of the airbag.

Also, according to the aspect wherein a lower side wall of the recess is formed with a through-hole and the airbag module is fastened to the lower side wall of the recess via a fastener passed through the through-hole, the fastener does not protrude forward, and discomfort felt in the back of the seated occupant can be reduced.

Also, according to the aspect wherein the bracket is located above a pressure receiving member (17) configured to support a back of an occupant, it is possible to prevent the bracket from causing discomfort felt in the back of the occupant.

Also, according to the aspect wherein a blower for blowing air is provided on a front face of the bracket, it is unnecessary to provide a bracket for supporting the blower within the vehicle seat, whereby the vehicle seat can be simplified.

Also, according to the aspect wherein the airbag module includes the airbag, an inflator configured to inflate the airbag, and a retainer provided with a guide wall that faces downward, and the airbag is guided by the guide wall to inflate rearward, it is possible to make the airbag deploy to the rear of the seat back.

Also, according to the aspect wherein the frangible portion is located substantially behind the guide wall, the airbag is guided by the guide wall to inflate toward the frangible portion, whereby a load is applied to the frangible portion easily.

Also, according to the aspect wherein at least a part of the frangible portion overlaps with the bracket in rear view and the airbag module is provided on a rear face of the bracket, because the frangible portion overlaps with the bracket in rear view, the airbag can pass the frangible portion easily, and thus, the airbag can easily deploy to the rear of the seat back. Further, at the time of airbag deployment or when the occupant seated in the rear seat collides with the airbag, the airbag module can be supported by the bracket.

Also, according to the aspect wherein the frangible portion extends laterally, and at least one of a first stay cloth and a second stay cloth is provided, the airbag module is covered by the skin member together with the seat back frame, and the airbag module is accommodated inside the seat back. In addition, at least one of the first stay cloth and the second stay cloth transmits the load caused by the inflation of the airbag to the frangible portion so that the frangible portion opens, whereby the airbag is allowed to deploy to the rear of the seat back through the frangible portion.

Also, according to the aspect wherein the pad member is provided with a first slit extending from a rear of a deployment port of the airbag module to a front of the frangible portion, it is possible to make the airbag deploy to the rear of the seat back. Since the airbag can be covered by the pad member, the touch feeling of the rear face of the vehicle seat is improved.

Also, according to the aspect wherein the pad member is provided with a second slit such that the first stay cloth is passed therethrough, the length of the first stay cloth can be reduced, and therefore, the load applied to the first stay cloth is easily transmitted to the frangible portion and this facilitates the opening of the frangible portion.

Also, according to the aspect wherein the second stay cloth extends along a lower edge and a rear edge of the pad member to reach a vicinity of the part below the frangible portion, the second stay cloth can be attached easily.

Also, according to the aspect wherein the bracket includes a rim wall protruding forward at a lower edge thereof and a hooking member is joined to the second stay cloth, the second stay cloth can be joined to the bracket easily.

Also, according to the aspect wherein the bracket includes an engagement portion above the airbag module, and an engaged member engaged by the engagement portion is joined to the base end of the first stay cloth, the first stay cloth can be joined to the bracket easily.

MODES FOR CARRYING OUT THE INVENTION

In the following, two embodiments in which a vehicle seat according to the present invention is applied to an automobile will be described with reference to the drawings.

First Embodiment

Figure 1:
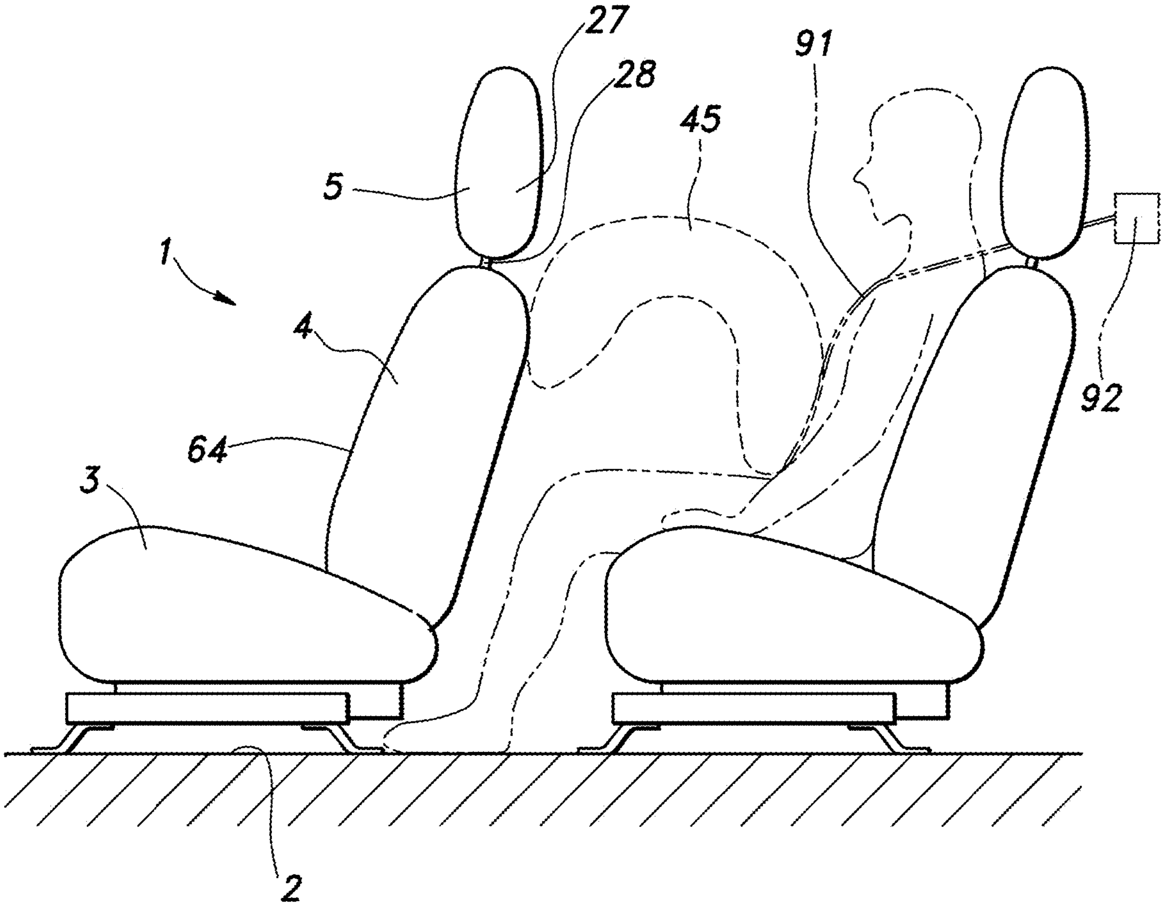
FIG. 1 is an explanatory diagram showing deployment of an airbag of a vehicle seat.

As shown in FIG. 1, a vehicle seat 1 according to the first embodiment of the present invention constitutes a front seat in the first row of an automobile. The seat includes a seat cushion 3 provided on a floor 2 of the automobile, a seat back 4 supported by a rear part of the seat cushion 3, and a headrest 5 provided on an upper part of the seat back 4.

Figure 2:
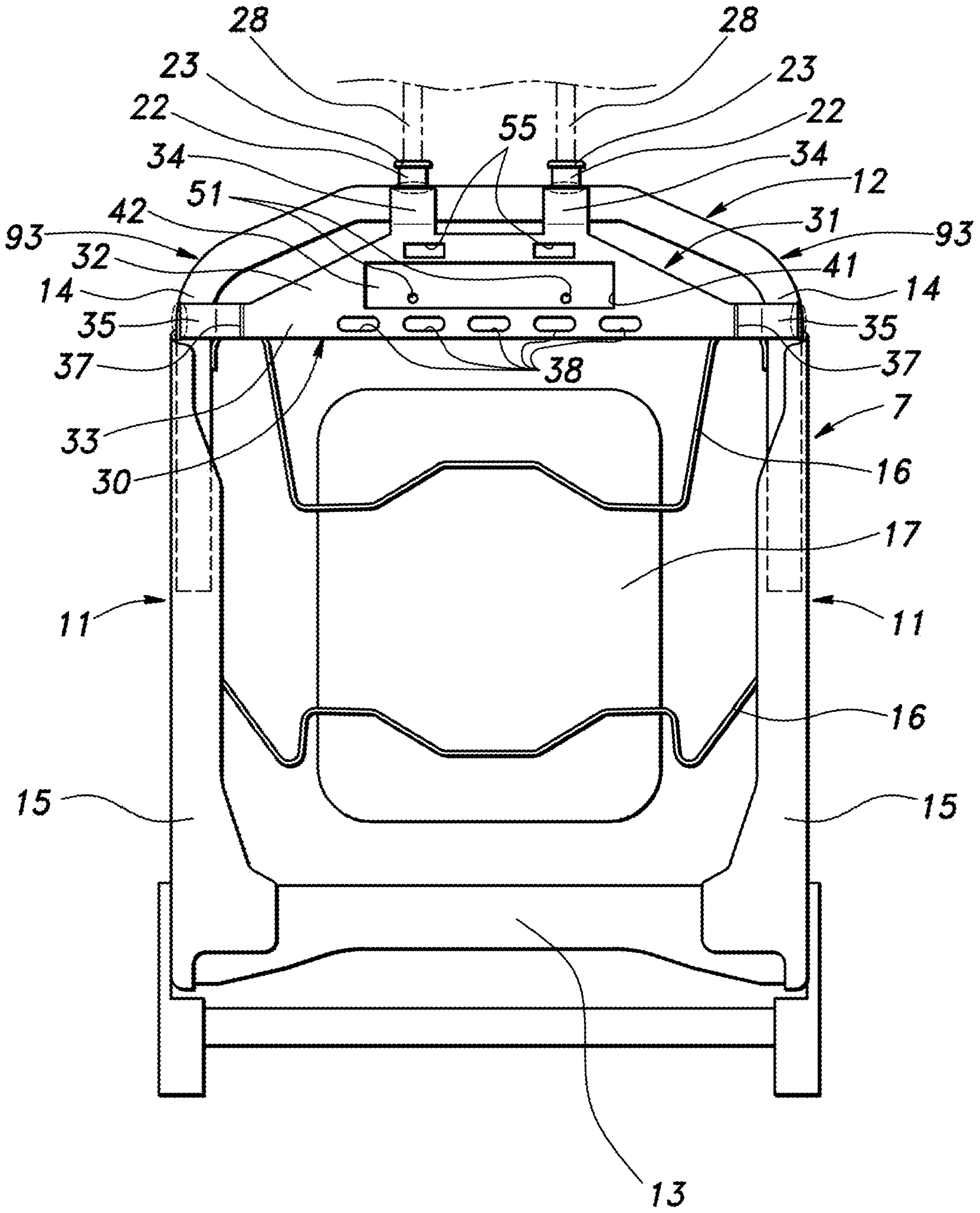
FIG. 2 is a rear view of a frame of the vehicle seat.

As shown in FIG. 2, the seat back 4 includes a seat back frame 7 serving as a skeleton, a pad member 8 supported by the seat back frame 7, and a skin member 9 provided on a surface of the pad member 8 and forming an exterior surface of the seat back 4.

The seat back frame 7 includes a pair of left and right side frames 11 extending vertically, an upper frame 12 extending laterally to be joined to the upper ends of the left and right side frames 11, and a lower frame 13 extending laterally to be joined to the lower parts of the left and right side frames 11. Side frame upper parts 14 that form the upper parts of the left and right side frames 11 and the upper frame 12 are formed by bending a single circular pipe in an inverted U-shape. Further, Side frame lower parts 15 constituting the lower parts of the side frames 11 are each formed of a sheet metal member and are welded to the respective ends of the pipe. A pair of upper and lower support members 16 is provided to extend between the left and right side frames 11. A plate-shaped pressure receiving member 17 for retractably supporting the back of the occupant is joined to the front side of the support members 16.

As shown in FIG. 2, an upper part of the seat back frame 7 is formed by the upper frame 12 and the left and right side frame upper parts 14 and has a substantially trapezoidal shape in rear view.

The upper frame 12 is provided with a flat front surface 21 on a front side of a laterally intermediate part thereof. The front surface 21 is formed by press-deforming the circular pipe so as to make the cross section thereof semicircular. A pair of left and right pillar support brackets 22 are welded to the front surface 21. Each pillar support bracket 22 is formed in a rectangular tube shape having open ends. The pillar support bracket 22 each have an axis extending substantially vertically and are laterally spaced from each other. Pillar support members 23 are inserted into the pillar support brackets 22, respectively. Each pillar support member 23 includes a tubular portion 24 and a flange portion 25 that protrudes sideways from the upper end of the tubular portion 24. The axial direction of the tubular portions 24 is substantially parallel with the extension direction of the side frames 11.

The headrest 5 includes a headrest main body 27 and a pair of left and right pillars 28 projecting from the headrest main body 27. With the pillars 28 inserted into the respective tubular portions 24, the headrest 5 is supported by the seat back frame 7 to be movable along the axes of the tubular portions 24. Each flange portion 25 is provided with an engagement means (not shown in the drawings) for fixing the insertion position of the pillar 28 relative to the tubular portion 24. The headrest 5 is fixed at a predetermined position by the engagement means.

A bracket 31 is joined to the side frames 11 and the upper frame 12. The bracket 31 is located in an upper half of the seat back frame 7. The bracket 31 is in a plate-like shape facing substantially in the fore-and-aft direction. The bracket 31 consists of a single plate member formed by drawing a sheet metal and includes a plate-shaped main portion 30 having a main surface facing in the fore-and-aft direction, a pair of left and right upper tongues 34 protruding upward from an upper edge of the main portion 30 in a strip shape, and a pair of left and right lower tongues 35 respectively protruding outward from the left and right lower parts of the main portion 30. The main portion 30 is constituted of a central part 32 forming an upper part of the main portion 30 and a bottom part 33 provided below the central part 32.

The central part 32 has a substantially trapezoidal shape having an upwardly diminishing lateral width in rear view. The central part 32 has a substantially same shape as that of the upper part of the seat back frame 7.

The upper tongues 34 protrude upward respectively from left and right ends of the upper edge of the central part 32 and are formed to be laterally spaced from each other. The upper tongues 34 are arranged to be laterally symmetrical about the lateral center line of the seat back frame 7. The upper tongues 34 are respectively curved at upper ends thereof to extend along the rear face of the upper frame 12 and are welded to the upper frame 12. The lower tongues 35 are curved to extend along the rear faces of the side frame upper parts 14 and are welded to the side frames 11, respectively. In the present embodiment, the upper tongues 34 are welded to upper parts of the rear face of the upper frame 12 (parts shown by broken lines in FIG. 2) and the lower tongues 35 are welded to left and right outer parts of the rear face of the side frame upper parts 14 (parts shown by broken lines in FIG. 2).

Figure 4:
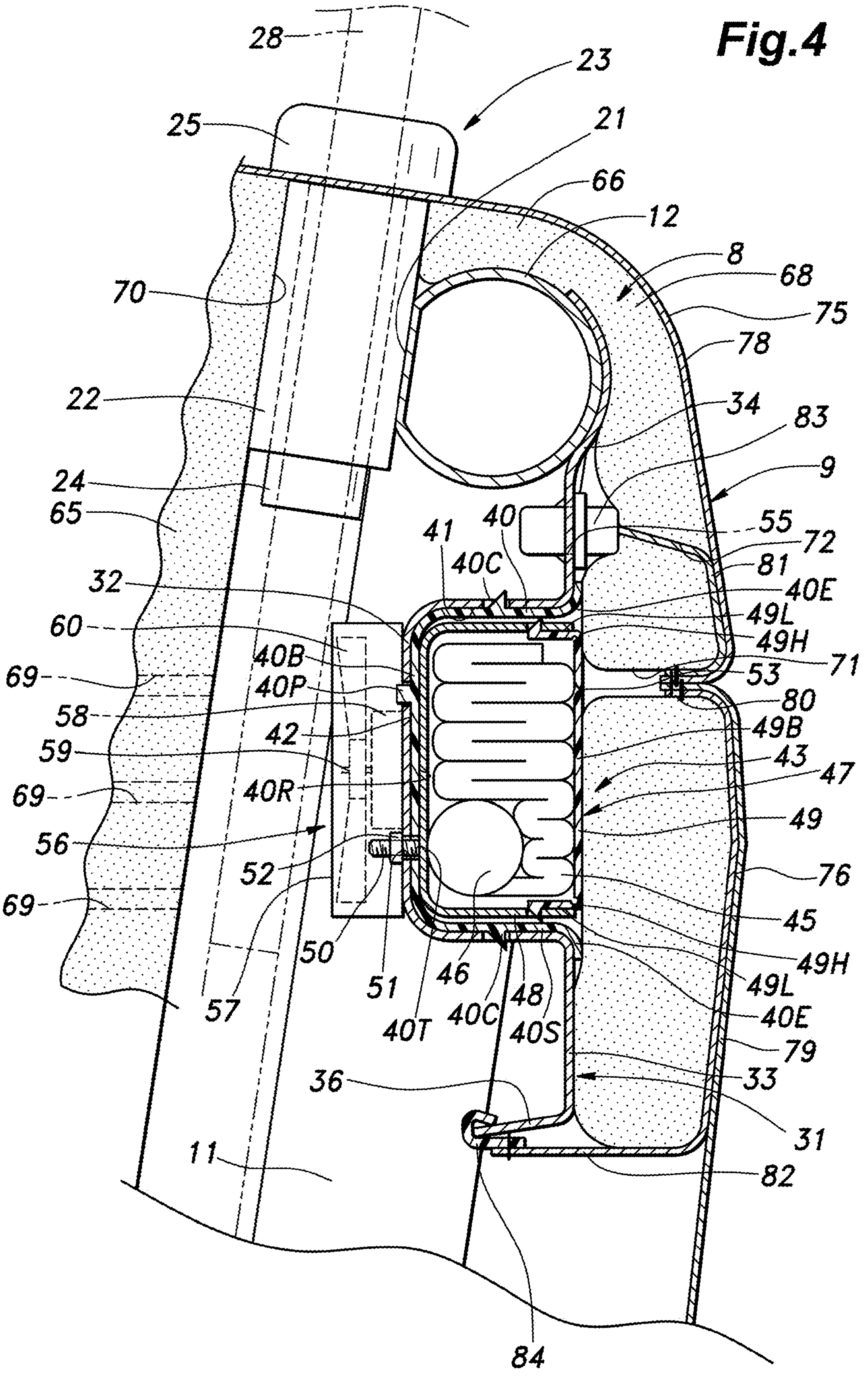
FIG. 4 is a sectional view of a vehicle seat according to the first embodiment taken along line IV-IV in FIG. 3.

As shown in FIG. 4, the lower edge of the bottom part 33 is provided with a rim wall 36 protruding forward over the entirety of the lower edge. At boundaries between the bottom part 33 and the lower tongues 35, a pair of left and right frangible portions 37 are formed. In the present embodiment, the bracket 31 is bent forward at the frangible portions 37 in a U-shape. Multiple lightening holes 38 are formed at appropriate positions of the bottom part 33 to reduce the weight of the bracket 31.

The rear face of the central part 32 is formed with a recess 41 that is recessed forward substantially at the center thereof. The bottom of the recess 41 overlaps with the side frames 11 in side view. The recess 41 is defined by a recess bottom wall 42 having a flat plate-like shape and facing substantially in the fore-and-aft direction and side walls surrounding the recess bottom wall 42. The recess bottom wall 42 is inclined rearward in the downward direction with respect to the axial direction of the pillars 28 in side view. The recess bottom wall 42 has a substantially rectangular shape extending laterally in rear view, and the recess 41 has a substantially rectangular cuboid shape.

The recess 41 houses therein an outer case 40 made of resin. The outer case 40 has a substantially rectangular cuboid shape that extends laterally. The outer case 40 includes a bottom wall 40B facing in the fore-and-aft direction and side walls 40S surrounding the bottom wall 40B. The outer case 40 is formed with a housing recess 40R defined by the bottom wall 40B and the side walls 40S. The housing recess 40R is recessed forward and opens rearward. At predetermined positions of the upper surface and the lower surface of the outer case 40 are provided engagement claws 40C that project outward in the vertical direction. The upper wall and the lower wall of the recess 41 are respectively provided with engagement holes penetrating therethrough at positions corresponding to the engagement claws 40C to engage the engagement claws 40C.

A fitting projection 40P that projects forward is provided at a predetermined position of the front face of the outer case 40, and the recess bottom wall 42 is provided with a positioning hole penetrating therethrough at a position corresponding to the fitting projection 40P. When the outer case 40 is joined to the recess 41, the engagement claws 40C are engaged with the engagement holes and the fitting projection 40P are inserted into the positioning hole, whereby the outer case 40 can be easily placed at an appropriate position.

An opening edge of the outer case 40 is provided with an extension 40E extending substantially orthogonal to the side walls 40S. The extension 40E extends more outward than the opening edge defining the opening of the recess 41 of the bracket 31. At least a part of the opening edge of the recess 41, preferably, the entire opening edge, is covered by the extension 40E from the rear.

An airbag module 43 is housed in the housing recess 40R. The airbag module 43 is in contact with the bottom wall 40B, and the airbag module 43 is accommodated inside the recess 41. The airbag module 43 includes an airbag 45, an inflator 46 configured to inflate the airbag 45, and a case 47 that houses the airbag 45 and the inflator 46.

The case 47 includes a retainer 48 having a substantially rectangular cuboid shape and provided with a recess that opens rearward and a lid 49 configured to close the opening of the recess.

The inflator 46 is substantially cylindrical in shape. The inflator 46 is housed in the recess of the retainer 48 to be positioned in the lower half of the retainer 48, more specifically in the lower front corner of the same, in a laterally extending manner and is joined to the retainer 48. The airbag 45 is housed in the recess of the retainer 48 in a folded state. The airbag 45 is positioned to cover the inflator 46 from above.

The retainer 48 includes an upper wall 44 defining the recess thereof. The upper wall 44 has a downward facing surface and opposes the inflator 46 vertically. The airbag 45 is positioned between the upper wall 44 and the inflator 46.

The lid 49 is made of resin. The lid 49 includes a plate-shaped lid main body 49B in a substantially rectangular cuboid shape having a main surface facing in the fore-and-aft direction and lid engagement portions 49L extending forward from upper, lower, left, and right ends of the lid main body 49B and each having an engagement claw at an end thereof. The upper, lower, left, and right walls of the retainer 48 are formed with respective engagement holes, and with the engagement claws engaging the corresponding engagement holes, the lid 49 is joined to the retainer 48. An inner side of the lid main body 49B is formed with a laterally extending groove. The lid main body 49B has a smaller thickness at the groove 53 than another part thereof. The groove 53 extends in the vertical direction from each of the left and right ends to the upper and lower ends of the lid main body 49B.

A hinge 49H is formed at the connection between the lid main body 49B and each lid engagement portion 49L, and the lid 49 is hinged to the upper edge and the lower edge of the opening of the retainer 48. When a load is applied to the lid 49 upon inflation of the airbag 45, the lid 49 is torn open along the groove 53. Thus, the groove 53 functions as a deployment port. Once the lid 49 is torn open, the upper rear part and the lower rear part of the lid 49 pivot with the upper edge and the lower edge being axes, respectively, so that the case 47 is opened. Since the opening edge of the recess 41 of the bracket 31 is covered by the extension 40E from the rear, when the airbag 45 inflates, the airbag 45 does not directly contact the opening edge of the recess 41 and the damage to the airbag 45 is prevented.

The front face of the retainer 48 is provided with a male threaded portion 50 that projects forward. The bottom wall of the outer case 40 and the recess bottom wall 42 are provided with through-holes 51, 44T, respectively, penetrating therethrough at a position corresponding to the male threaded portion 50. By passing the male threaded portion 50 through the two through-holes 51 of the outer case 40 and the recess bottom wall 42 and then attaching a nut 52 to the male threaded portion 50, the airbag module 43 is fastened to the bracket 31 together with the outer case 40. After the fastening, the case 47 is located at a position overlapping with the side frames 11 in side view.

In an upper part of the central part 32 above the recess 41, a pair of left and right mounting holes 55 are formed to penetrate therethrough in the thickness direction.

A blower 56 is joined to the front face of the recess bottom wall 42. The blower 56 includes a blower case 57, a motor 58 accommodated in the blower case 57, and a fan 60 joined to the rotation shaft 59 of the motor 58.

The blower case 57 has a substantially rectangular cuboid shape having a surface facing in the fore-and-aft direction. The front wall of the blower case 57 is formed with an opening. The blower case 57 is formed with through-holes at predetermined positions thereof to penetrate therethrough in the fore-and-aft direction, and the recess bottom wall 42 is formed with screw holes at positions thereof corresponding to the through-holes. The blower case 57 is joined substantially to the center of the front face of the recess bottom wall 42 with respect to the lateral direction by means of screws passed through the through-holes and engaging the screw holes. The front wall of the blower case 57 is substantially parallel with the recess bottom wall 42, and the blower case 57 is located between the left and right pillars 28. In the present embodiment, the width of the blower case 57 in the fore-and-aft direction is substantially small, and the front wall of the blower case 57 is located rearward of the pillars 28 in side view.

A cable (not shown in the drawings) is connected to the motor 58 for supplying electric power from the outside of the vehicle seat 1. The motor 58 is driven by the supplied electric power to rotate the fan 60. The rotation of the fan 60 causes air to be blown forward.

The pad member 8 is made of a flexible cushioning material such as polyurethane foam. The pad member 8 includes a front portion 65 constituting a backrest surface 64 that opposes the back of the occupant, an upper portion 66 extending rearward from the upper edge of the front portion 65, side portions 67 extending rearward from the left and right side edges of the front portion 65, and a rear portion 68 extending downward from the rear end of the upper portion 66.

The front portion 65 is in a substantially rectangular plate-like shape extending vertically and having a predetermined thickness in the fore-and-aft direction. The rear face of the front portion 65 is in contact with the front faces of the side frames 11, the upper frame 12, and the pressure receiving member 17. The front portion 65 is formed with air passage holes 69 penetrating therethrough in the fore-and-aft direction in front of the blower 56. The air blown from the blower 56 passes through the air passage holes 69 to the backrest surface 64.

The upper portion 66 extends rearward from the upper edge of the front portion 65 to the rear edge of the upper frame 12 in side view. The upper portion 66 is formed with through-holes 70 vertically penetrating therethrough at positions corresponding to the upper ends of the left and right pillar support brackets 22. Each through-hole 70 receives therein the corresponding pillar support bracket 22.

The side portions 67 extend rearward from the left and right side edges of the front portion 65 along the left and right exterior surfaces of the side frames 11 to reach the rear faces of the side frames 11.

Figure 3:
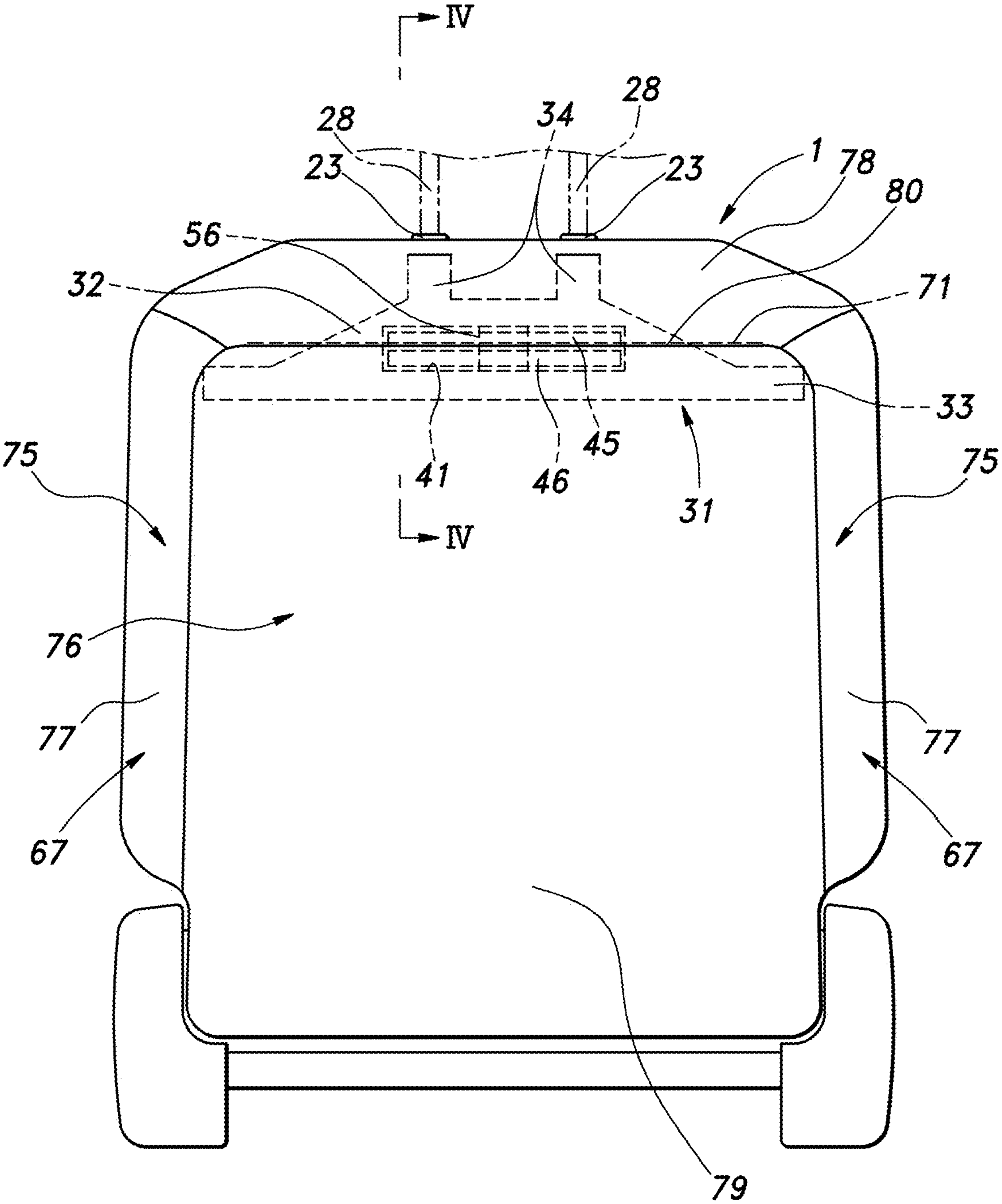
FIG. 3 is a rear view of the vehicle seat.

The rear portion 68 extends downward from the rear end of the upper portion 66 to reach the lower end of the bracket 31. The rear portion 68 is formed with a first slit 71 penetrating therethrough in the thickness direction at a position behind the recess bottom wall 42 and, more specifically, behind the groove 53. The first slit 71 extends substantially orthogonally to the recess bottom wall 42 in the penetrating direction. As shown in FIG. 3, the first slit 71 extends in the lateral direction from between the left side frame 11 and the left wall of the recess 41 to between the right side frame 11 and the right wall of the recess 41. The width of the first slit 71 in the lateral direction is larger than the width of the recess 41 in the lateral direction and is preferably larger than the width of the central part 32 in the lateral direction.

The rear portion 68 is formed with two second slits 72 penetrating therethrough in the thickness direction at positions behind the respective mounting holes 55. Each of the second slits 72 is preferably inclined to approach the surface-side opening of the first slit 71 as the second slit 72 extends rearward in the penetrating direction, The width of each second slit 72 in the lateral direction is substantially the same as that of the mounting hole 55 in the lateral direction.

As shown in FIGS. 3 and 4, the skin member 9 is formed in a bag shape by combining a front sheet member 75 integrally covering the surfaces of the front portion 65, the upper portion 66, the side portions 67, and the rear portion 68 of the pad member 8 and a rear sheet member 76 constituting the rear face of the seat back 4.

The front sheet member 75 is formed by sewing together multiple pieces each made of a sheet member, such as a piece of cloth, leather, etc. The front sheet member 75 includes a front piece covering the surface of the front portion 65, side pieces 77 covering the surfaces of the left and right side portions 67, and an upper piece 78 covering the surfaces of the upper portion 66 and the rear portion 68. The upper edge of the front piece is sewn to the front edge of the upper piece 78, the left and right side edges of the front piece are sewn to the front edges of the side pieces 77, and the upper edges of the side pieces 77 are sewn to the left and right side edges of the upper piece 78. The rear sheet member 76 is formed of a rear piece 79 made of a sheet member. The rear piece 79 has a substantially rectangular shape that extends vertically. The upper edge of the rear piece 79 is sewn to the rear end edge of the upper piece 78 to form a seam 80. The seam 80 functions as a frangible portion configured to be broken with a smaller load compared to the other seams.

The seam 80 is located in the rear end opening portion of the first slit 71. The seam 80 is located behind an upper half of the recess 41 and, more specifically, substantially behind the upper wall 44 of the retainer 48. Therefore, the seam 80 is located higher than the inflator 46. The seam 80 is formed to extend laterally. The left end and the right end of the seams 80 are respectively located on the left and right outside of the recess 41. Preferably, the left end and the right end of the seam 80 are located on the left and right outside of the main portion 30 of the bracket 31.

The upper side edges of the rear piece 79 are sewn to the upper side edges of the side pieces 77. The lower side edges of the rear piece 79 and the lower side edges of the side pieces 77 are openably joined by means of fasteners, touch and close fasteners, snap-fits, or the like. Thereby, the skin member 9 can be joined to the seat back 4 by putting the skin member 9 on the seat back frame 7 and the pad member 8 and then joining the rear piece 79 and the side pieces 77 to each other.

Between the bracket 31 and the skin member 9, a first stay cloth 81 and a second stay cloth 82 for restricting the deployment direction of the airbag 45 are provided. Each of the first stay cloth 81 and the second stay cloth 82 is formed of a sheet member having a lower stretchability than that of the skin member 9. One ends of the first stay cloth 81 and the second stay cloth 82 are joined to the bracket 31 at positions above and below the airbag module 43, respectively. The one end of the first stay cloth 81 has a pair of left and right clips 83 attached thereto. Each clip 83 is fitted into the corresponding mounting hole 55. The one end of the second stay cloth 82 has J-shaped hooks 84, which serve as hooking members, attached thereto. Each hook 84 is hooked to the rim wall 36. The first stay cloth 81 extends rearward from the clips 83 and passes through the second slits 72 to reach the upper vicinity of the seam 80. The second stay cloth 82 extends rearward and then upward along the lower edge and the rear edge of the rear portion 68 to reach the lower vicinity of the seam 80. The other end of the first stay cloth 81 and the lower edge of the upper piece 78 are sewn to each other in the vicinity of the seam 80. The other end of the second stay cloth 82 and the upper edge of the rear piece 79 are sewn to each other in the vicinity of the seam 80.

Next, an operation of the vehicle seat 1 will be described. A forward acceleration or load is applied to the occupant seated in the rear seat at the time of a frontal collision or the like. To detect such a load applied to the occupant seated in the rear seat, a sensor 92 configured to detect the load applied to the seat belt 91 worn by the occupant seated in the rear seat may be provided, for example.

When the acceleration of the occupant seated in the rear seat or the load applied to the seat belt 91 becomes higher or equal to a predetermined value, gas is discharged from the inflator 46. The airbag 45 inflating upward due to the gas discharged from the inflator 46 is guided rearward by the lower surface of the upper wall 44 of the retainer 48. Thus, the upper wall 44 of the retainer 48 functions as a guide wall for guiding the inflation direction of the airbag 45. The rearward inflation of the airbag 45 applies a load on the lid 49, and the lid 49 is torn open at the groove 53, whereby the case 47 of the airbag module 43 is opened. The airbag 45 protrudes from the case 47 and passes through the first slit 71 by being guided by the first stay cloth 81 and the second stay cloth 82 to reach the seam 80. At this time, the seam 80 is broken by the load from the airbag 45 and an opening is formed in the skin member 9. The airbag 45 passes through the opening to protrude from the rear face of the seat back 4, and after inflating rearward and obliquely upward, deploys to extend downward and rearward. The airbag 45 is arched to be convex upward at the time of deployment (broken line in FIG. 1). Therefore, regardless of the distance between the vehicle seat 1 and the rear seat, it is possible to cause the airbag 45 to deploy to the front of the upper half of the occupant's body. When the rear seat is near the vehicle seat 1, the airbag 45 is bent so that the rearward load applied to the occupant by the deployment of the airbag 45 can be reduced.

Next, effects of the vehicle seat 1 will be described. As shown in FIG. 4, the airbag module 43 is covered by the skin member 9 and is located inside the seat back 4. Since the airbag module 43 is not exposed to the rear face of the seat back 4, the aesthetic appearance of the vehicle seat 1 can be improved. Further, since the airbag module 43 is covered by the pad member 8, the touch feeling of the rear face of the vehicle seat 1 is improved.

Since the airbag module 43 is housed in the recess 41, an amount of protrusion of the airbag module 43 from the rear face of the seat back 4 can be reduced. The front part of the case 47 of the airbag module 43 is located at a position below the upper frame 12 and overlapping with the side frames 11 in side view. Thus, compared to a case where the case 47 as a whole is located in the rear of the side frames 11, the airbag module 43 is located more forward relative to the seat back frame 7. Therefore, an amount of rearward protrusion of the seat back 4 can be reduced.

The airbag 45 is caused to inflate along the first slit 71 by the gas from the inflator 46. The inflation applies an upward load to the first stay cloth 81 and a downward load to the second stay cloth 82. The loads applied to the first stay cloth 81 and the second stay cloth 82 are transmitted to the seam 80, the parts of the skin member 9 in the upper vicinity and the lower vicinity of the seam 80 are pulled upward and downward, respectively, so that the seam 80 is opened. The airbag 45 passes through the first slit 71 and the opened seam 80 to deploy to the rear of the seat back 4.

Owing to the formation of the second slits, the first stay cloth 81 can be arranged to extend substantially linearly from the rear of the mounting holes 55 to the front of the seam 80. This can reduce the length of the first stay cloth 81 in the fore-and-aft direction. Therefore, the load applied to the first stay cloth 81 is easily transmitted to the seam 80 and this facilitates the opening of the seam 80.

The second stay cloth 82 extends along the lower edge and the rear edge of the pad member 8 to reach the vicinity of the lower part of the seam 80. Therefore, after the pad member 8 and the skin member 9 are assembled together and the seat back frame 7 is covered with the assembly, the hooks 84 can be hooked to the rim wall 36 from below. Thus, the attachment of the second stay cloth 82 is easy.

The first stay cloth 81 is provided with the pair of clips 83 and the first stay cloth 81 can be joined to the bracket 31 easily by inserting the clips 83 to the mounting holes 55, respectively. Also, since the first stay cloth 81 is joined to the two mounting holes 55 arranged in the lateral direction, an area of the first stay cloth 81 for receiving the load due to the inflation of the airbag 45 is widened in the lateral direction, whereby the load due to the inflation of the airbag is applied to the seam 80 even more easily.

The one ends of the first stay cloth 81 and the second stay cloth 82 are engaged by parts of the bracket 31 in the vicinity of the airbag module 43, and therefore, the load can be easily transmitted to the first stay cloth 81 and the second stay cloth 82. Also, the first stay cloth 81 and the second stay cloth 82 allows the load due to the deployment of the airbag 45 to concentrate on the seam 80, whereby the seam 80 can be broken reliably at the time of deployment of the airbag 45.

The airbag 45 inflates rearward relative to the recess 41. The seam 80 overlaps with the recess 41 at the central part thereof in rear view, and therefore, the airbag 45 inflating rearward can pass the seam 80 easily.

The seam 80 (frangible portion) is located below the upper frame 12, and therefore, the load applied to the skin member 9 due to the inflation of the airbag 45 is easily transmitted to the seam 80 (frangible portion) and this facilitates the opening of the seam 80 (frangible portion). With at least a part of the seam 80 (frangible portion) overlaps with the recess 41 in rear view, the airbag 45 is allowed to pass the seam 80 (frangible portion) easily. Further, in the case where the seam 80 (frangible portion) overlaps with the upper half of the recess 41 in rear view, the airbag 45 can deploy rearward from a higher part of the seat back 4.

As shown in FIG. 3, the seam 80 extends laterally on the rear face of the seat back 4. Therefore, the width of the airbag 45 in the lateral direction (lateral width) at the time of deployment can be made large and a wide range of lateral positions of the occupant seated in the rear seat can be dealt with. Further, the left end and the right end of the seam 80 are respectively located on the left and right outside of the recess 41, and preferably, the left end and the right end of the seam 80 are respectively located on the left and right outside of the main portion 30 of the bracket 31. Thus, owing to the enlarged lateral width of the seam 80, the airbag 45 inflating rearward can pass through the seam 80 easily. Also, the lateral width of the airbag 45 at the time of deployment can be made large and a wider range of lateral positions of the occupant seated in the rear seat can be dealt with.

That is, since the lateral width of the seam 80 (frangible portion) is larger than the lateral width of the recess 41 in rear view, the airbag 45 can pass through the seam 80 (frangible portion) more easily. Also, the lateral width of the airbag 45 at the time of deployment can be made larger.

It is conceivable to join the airbag module to the seat back frame by providing an airbag case for supporting the airbag module, fastening the airbag case to the side frames at left and right edges of a lower end thereof, and hooking an upper end center of the airbag case to a projection provided on the upper frame. In this case, when the airbag deploys rearward, a forward load is applied to the airbag case. Since the upper part of the airbag case is hooked to the upper frame at the upper end center thereof, there is a problem that the rotation of the upper part of the airbag case may not be sufficiently restricted and the deployment direction of the airbag may become unstable.

However, in the present embodiment, as shown in FIG. 2, the bracket 31 is joined to the upper frame 12 at the left and right upper tongues 34 in a laterally spaced relationship. Therefore, the rotation of the upper part of the bracket 31 about an axis extending in a substantially vertical direction is restricted. Thus, the bracket 31 is not separated from the seat back frame 7 easily and the joint between the bracket 31 and the seat back frame 7 can be made stronger.

Since the bracket 31 is constituted of a single plate member, the bracket 31 can be light in weight and low in cost. The bracket 31 is in a substantially trapezoidal shape with an upper side being a short side and is substantially identical in shape with an upper part of the seat back frame 7. Therefore, the upper tongues 34 and the lower tongues 35 can be made short. Further, the upper right corner and the upper left corner of the bracket 31 are cut, the weight of the bracket 31 is reduced.

A forward load is applied to the bracket 31 by deployment of the airbag 45 or collision of the occupant seated in the rear seat. Since the upper tongues 34 are disposed to extend along the rear face of the upper frame 12 and the lower tongues 35 are disposed to extend along the rear face of the side frame upper parts 14, a rearward load is applied to the upper tongues 34 and the lower tongues 35 from the rear face of the upper frame 12 and the rear face of the side frame upper parts 14. Therefore, the bracket 31 can be supported by the seat back frame 7 and resist against the forward load.

The airbag module 43 is fastened to the recess bottom wall 42. At the time of deployment of the airbag 45, a forward load is applied to the airbag module 43. Because the airbag module 43 is fastened to the recess bottom wall 42, the bracket 31 resists against the load and the airbag module 43 is supported by the bracket 31. Also, since the airbag module 43 is fastened to the recess bottom wall 42, the airbag module 43 can be fastened to the bracket 31 easily.

The airbag module 43 is located in the upper half of the seat back frame 7. Therefore, the airbag module 43 is located in front of the upper body of the occupant seated in the rear seat, whereby the airbag 45 can deploy to the front of the upper body of the occupant seated in the rear seat to protect the upper body of the occupant seated in the rear seat. Further, since the seam 80 is located behind the upper part of the recess 41, the airbag 45 can deploy from a higher part of the seat back 4.

The bracket 31 is located rearward of the pillars 28. Therefore, it is possible to attach the bracket 31 without changing the position of the pillars 28.

A load applied when the occupant is seated may cause the back of the occupant to move to the rear of the axes of the pillars 28. In this case also, since the recess bottom wall 42 is inclined rearward in the downward direction, the recess bottom wall 42 does not interfere with the back of the occupant and the discomfort felt by the occupant can be reduced. Further, because the bracket 31 is located above the pressure receiving member 17, it is possible to prevent the bracket 31 from causing discomfort felt in the back of the occupant.

The bottom part 33 laterally connects the side frames 11 via the lower tongues 35, and thus, functions as a cross member increasing the stiffness of the seat back frame 7. To increase the stiffness of the seat back frame 7, preferably, the bottom part 33 is joined to a part of each side frame 11 apart from the upper end of the side frame 11 by 5-20% of the entire length of the side frame 11. In a case where the side frames 11 are formed with bent portions 93 that are bent laterally inward, the bottom part 33 is preferably joined to the side frames 11 at positions above the bent portions 93. The stiffness of the bottom part 33 is improved by the rim wall 36. Since the lower wall defining the recess 41 and the rim wall 36 oppose each other and the lower part of the bracket 31 has a channel shape that opens forward in side view, the stiffness is further improved. The improvement of the stiffness of the lower part of the bracket 31 makes the joint between the side frames 11 strong, whereby the stiffness of the seat back frame 7 is improved even further.

The provision of the blower 56 in the vehicle seat 1 allows air to be blown from the air passage holes 69 of the seat back 4 toward the seated occupant, whereby the sitting comfort can be improved. Because the blower 56 is joined to the bracket 31 supporting the airbag 45, there is no need to provide a bracket 31 for supporting the blower 56, whereby the number of components is reduced and the vehicle seat 1 can be made simple.

Also, when the airbag 45 deploys, the occupant seated in the rear seat may collide with the airbag 45 so that a forward load is applied to the bracket 31. At this time, the frangible portions 37 of the bracket 31 can deform to absorb the forward load applied to the bracket 31. Therefore, it is possible to reduce the load applied to the occupant seated in the rear seat. Further, it is possible to prevent the collision of the occupant seated in the rear seat from applying a load to the occupant of the vehicle seat 1.

Second Embodiment

Figure 5:
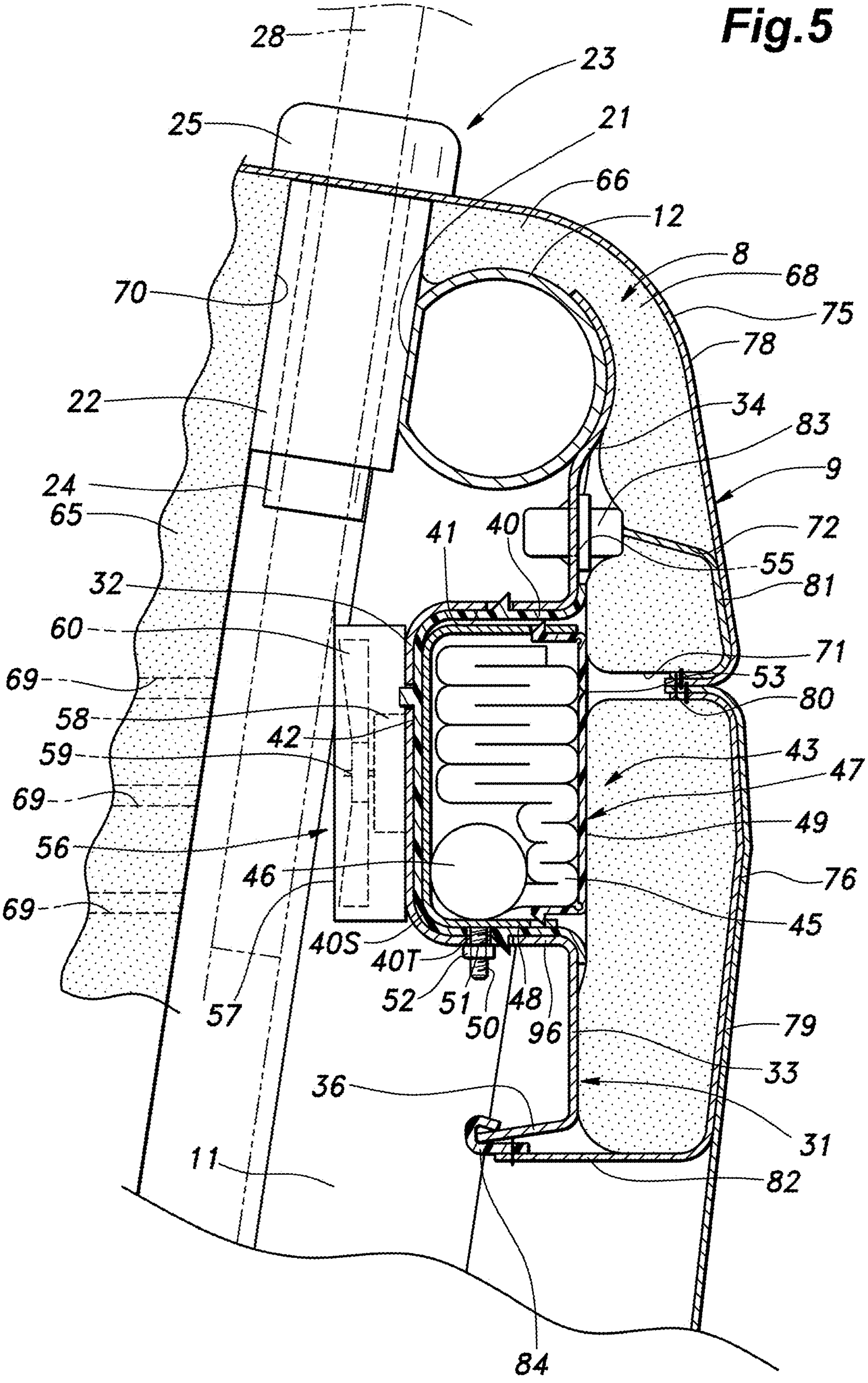
FIG. 5 is a sectional view of the vehicle seat according to the second embodiment.

The vehicle seat 1 according to the second embodiment differs from the first embodiment in that, as shown in FIG. 5, the airbag module 43 is fastened to a recess lower wall 96 defining a lower part of the recess 41 and facing in the vertical direction. The male threaded portion 50 provided on the airbag module 43 extends downward. The recess lower wall 96 is provided with a through-hole 51 at a position corresponding to the male threaded portion 50. One side wall 40S of the outer case 40 is provided with a through-hole 40T at a position corresponding to the male threaded portion 50. By passing the male threaded portion 50 through the through-holes 51, 41T and joining the nut 52 to the male threaded portion 50, the airbag module 43 is fastened to the recess lower wall 96. The airbag module 43 may be fastened to any of the side walls surrounding the recess bottom wall 42.

The airbag 45 is configured to deploy upward and rearward of the seat back 4, and therefore, at the time of deployment of the airbag 45, a load may be applied to the recess 41 in the downward direction. With the airbag module 43 fastened to the recess lower wall 96, the bracket 31 can resist against the downward load at the time of deployment. In addition, because the male threaded portion 50 does not protrude forward, the discomfort felt in the back of the seated occupant can be reduced.

Third Embodiment

Figure 6:
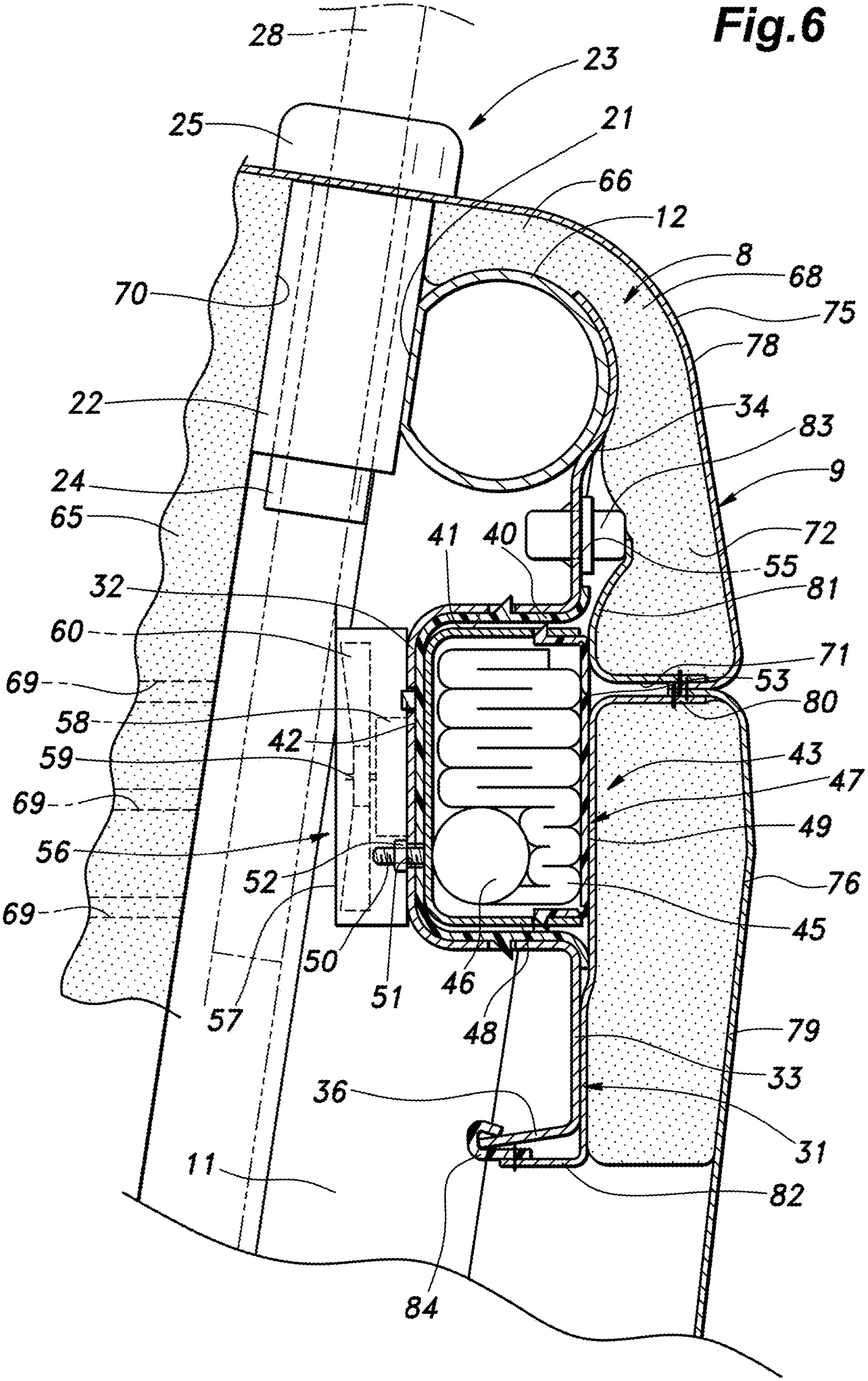
FIG. 6 is a sectional view of the vehicle seat according to the third embodiment.

The vehicle seat 1 according to the third embodiment differs from the first embodiment in that, as shown in FIG. 6, the second slits 72 are not provided and only the arrangement of the first stay cloth 81 and the second stay cloth 82 is changed. The first stay cloth 81 is fixed to the mounting holes 55 by the clips 83 at one end thereof and extends downward along a reverse side of the pad member 8 to reach the seam 80 through the first slit 71. The second stay cloth 82 is hooked to the rim wall 36 by the hooks 84 on one end thereof and extends upward along the reverse side of the pad member 8 to reach the seam 80 through the first slit 71. In this arrangement also, the first stay cloth 81 and the second stay cloth 82 restrict the deployment direction of the airbag 45 from above and below, respectively, the deployment direction of the airbag 45 is controlled to be directed toward the seam 80.

Figure 7B:
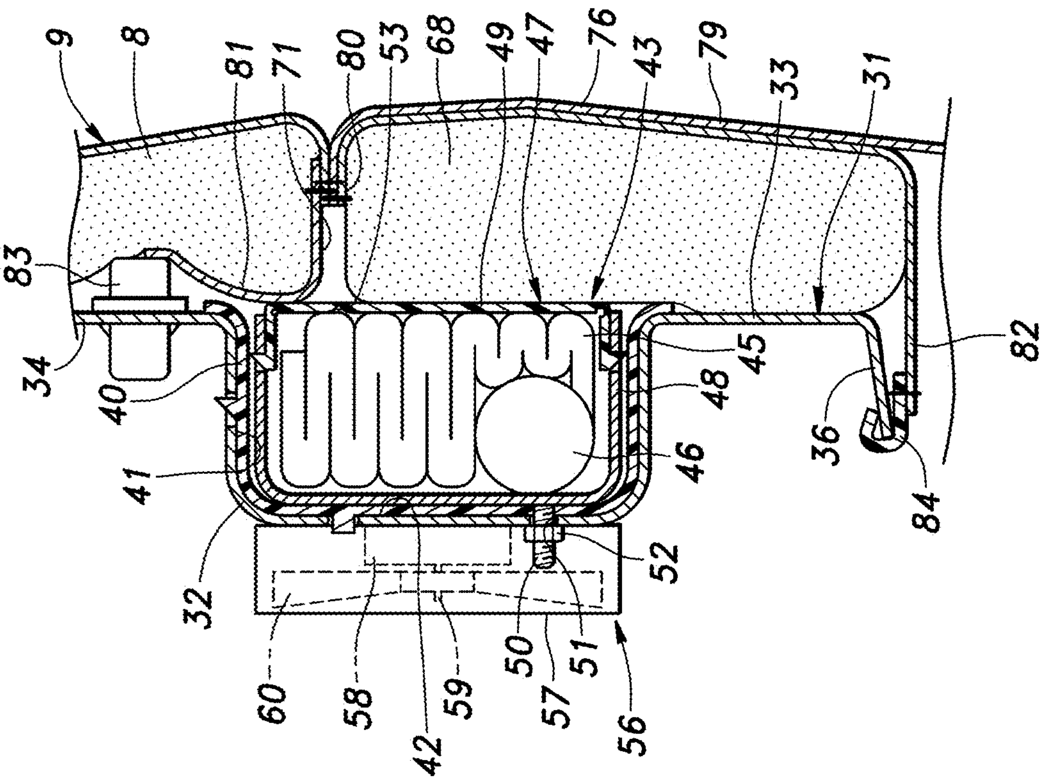
FIG. 7B is a sectional view of a vehicle seat according to another embodiment, in which the arrangement of a first stay cloth is different compared to the first embodiment.
Figure 7A:
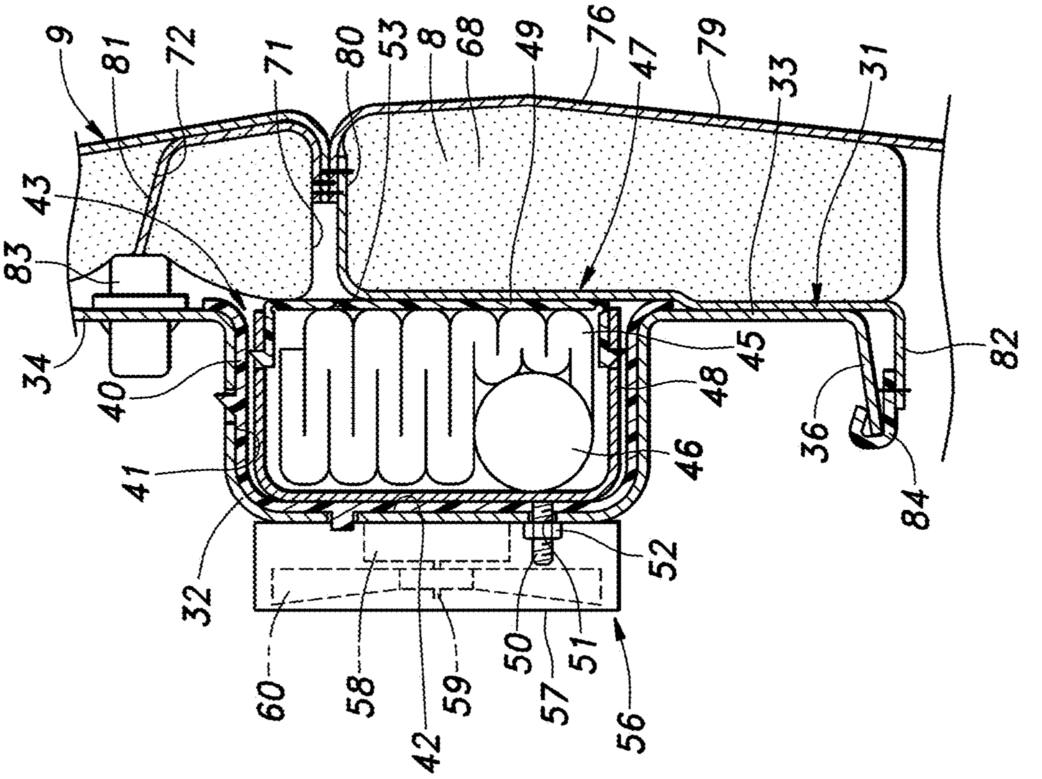
FIG. 7A is a sectional view of a vehicle seat according to another embodiment, in which the arrangement of a second stay cloth is different is different compared to the first embodiment.

Concrete embodiments of the present invention have been described in the foregoing but the present invention is not limited to the above embodiments and may be modified or altered in various ways. For example, the shape of the bracket 31 is not limited to that shown in the above embodiments and may be changed as appropriate. In the above embodiments, the second stay cloth 82 was hooked to the rim wall 36 of the bottom part 33 but may have clips fitted into the lightening holes 38, for example. In the above embodiments, the vehicle seat 1 was provided with the first stay cloth 81 and the second stay cloth 82 but an embodiment in which either one of the first stay cloth 81 and the second stay cloth 82 is provided may be possible. Also, a modification may be made to the first embodiment such that only the second stay cloth 82 extends along a reverse side of the pad member 8 as shown in FIG. 7A or only the first stay cloth 81 extends along the reverse side of the pad member 8 as shown in FIG. 7B.

In the above embodiments, the seam 80 was formed to extend laterally on the rear face of the seat back 4 but it is possible to divide each of the side pieces 77 to upper and lower parts and to provide the left and right ends of the seam 80 on the left and right exterior surfaces of the side portions 67 so that the seam 80 extends laterally between the left and right side faces of the seat back 4 via the rear face.

Figure 8A:
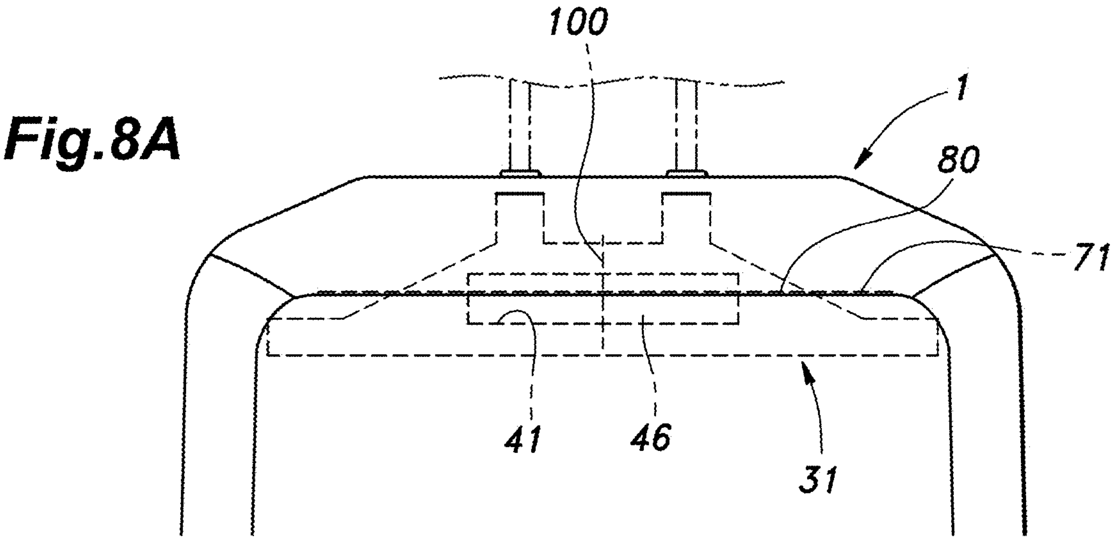
FIG. 8A is a rear view of a vehicle seat according to another embodiment, in which a pad member is provided with crossing two slits.
Figure 8B:
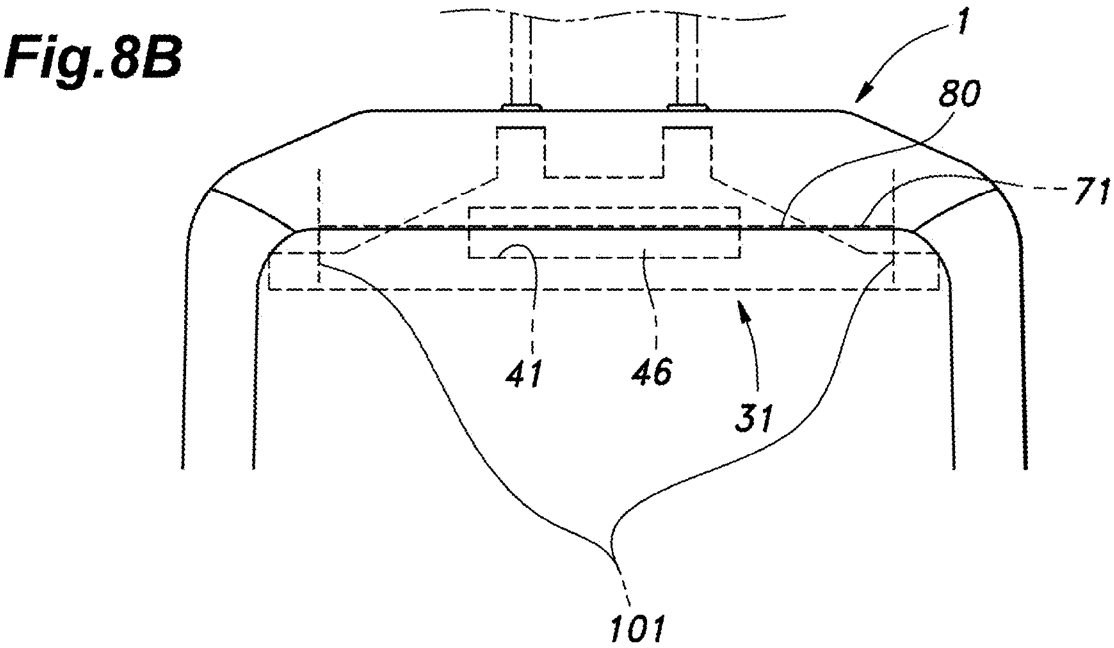
FIG. 8B is a rear view of a vehicle seat according to another embodiment, in which a pad member is provided with a slit forming a substantially H-shape.

Also, in the above embodiments, the first slit 71 was formed in the pad member 8 to extend laterally, but the present invention is not limited to this embodiment. The pad member 8 may be provided with a third slit 100 that intersects with the first slit 71 (FIG. 8A). Further, third slits 101 may be provided at respective ends of the first slit 71 such that each third slit 101 extends upward and downward from the corresponding end (FIG. 8B). The provision of the third slits 100, 101 makes the pad member 8 easier to open from the first slit 71, thereby to shorten the time required for the airbag 45 to deploy.

Figure 9B:
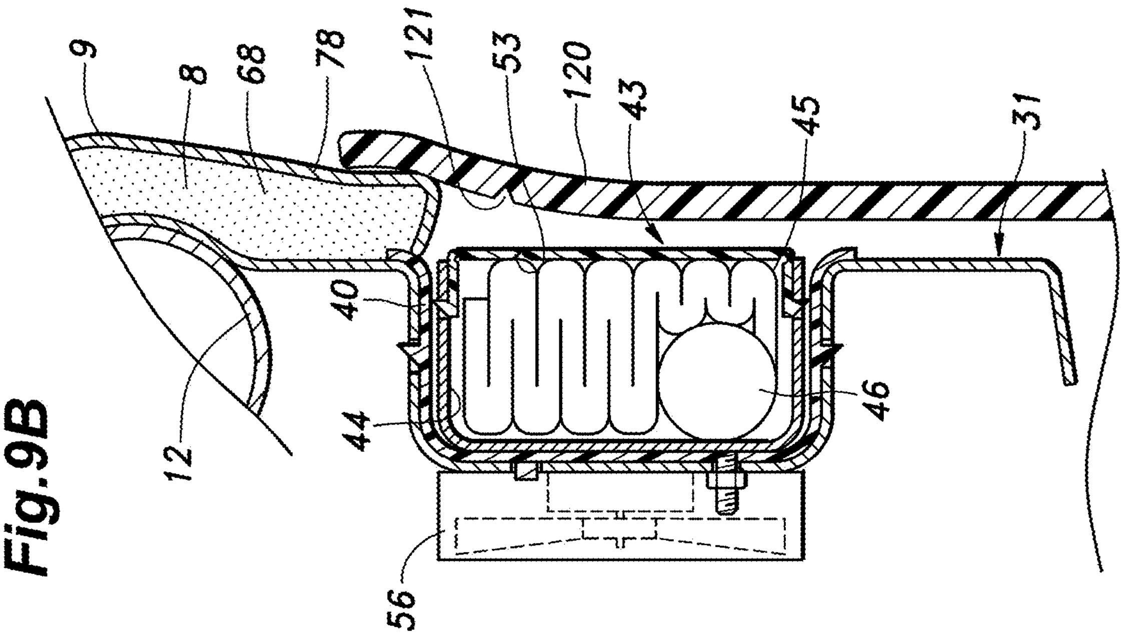
FIG. 9B is a sectional view of a vehicle seat according to another embodiment provided with a backboard having a slit.
Figure 9A:
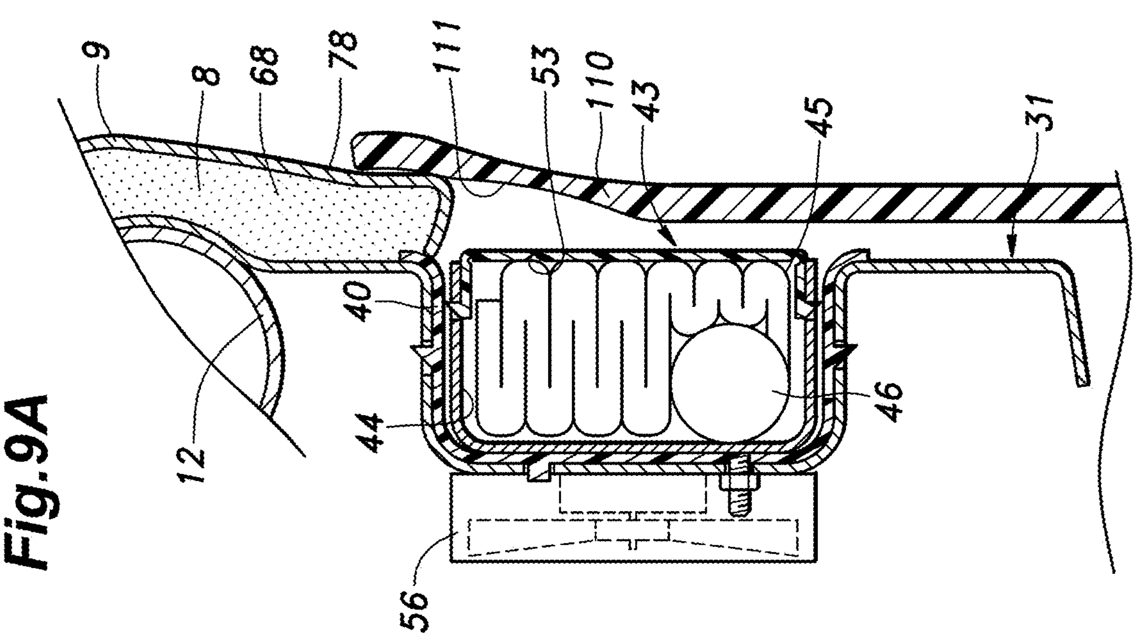
FIG. 9A is a sectional view of a vehicle seat according to another embodiment provided with a backboard having a thin-walled portion.

Also, in the above embodiments, the rear face of the seat back 4 was provided with the rear sheet member 76 made of a sheet member but, as shown in FIG. 9A, instead of the rear sheet member 76, it may be provided with a backboard 110 made of resin or the like. The backboard 110 is formed in a plate-like shape having a main surface facing in the fore-and-aft direction. The upper end of the backboard 110 is bent rearward as it extends upward along the rear portion 68. The backboard 110 is supported by the side frames 11. The upper part of the backboard 110 is formed with a thin-walled portion 111 having a smaller thickness such that the thin-walled portion 111 extends laterally in rear view. The thin-walled portion 111 is preferably formed substantially behind the groove 53 of the airbag module 43. When the airbag 45 deploys, a load is applied to the backboard 110 from the airbag 45. The load causes the backboard 110 to be bent rearward at the thin-walled portion 111. The bending of the backboard 110 creates a gap between the backboard 110 and the skin member 9 covering the rear portion 68. The airbag 45 deploys rearward of the seat back 4 rearward through the gap.

Also, as shown in FIG. 9B, a backboard 120 having a slit 121 configured to be torn open by the load applied from the airbag 45 at the time of deployment of the airbag 45 may be provided. The slit 121 is located behind the airbag module 43. The slit 121 may be a groove formed in the front face of the backboard 120. The slit 121 preferably includes a part extending laterally and parts extending upward and downward from either end of the laterally extending part to form a substantially H-shape in rear view. When the airbag 45 deploys, the backboard 120 is bent rearward at the laterally extending part so that an opening is formed in the backboard 120. The airbag 45 deploys rearward of the seat back 4 through the opening.

Figure 10B:
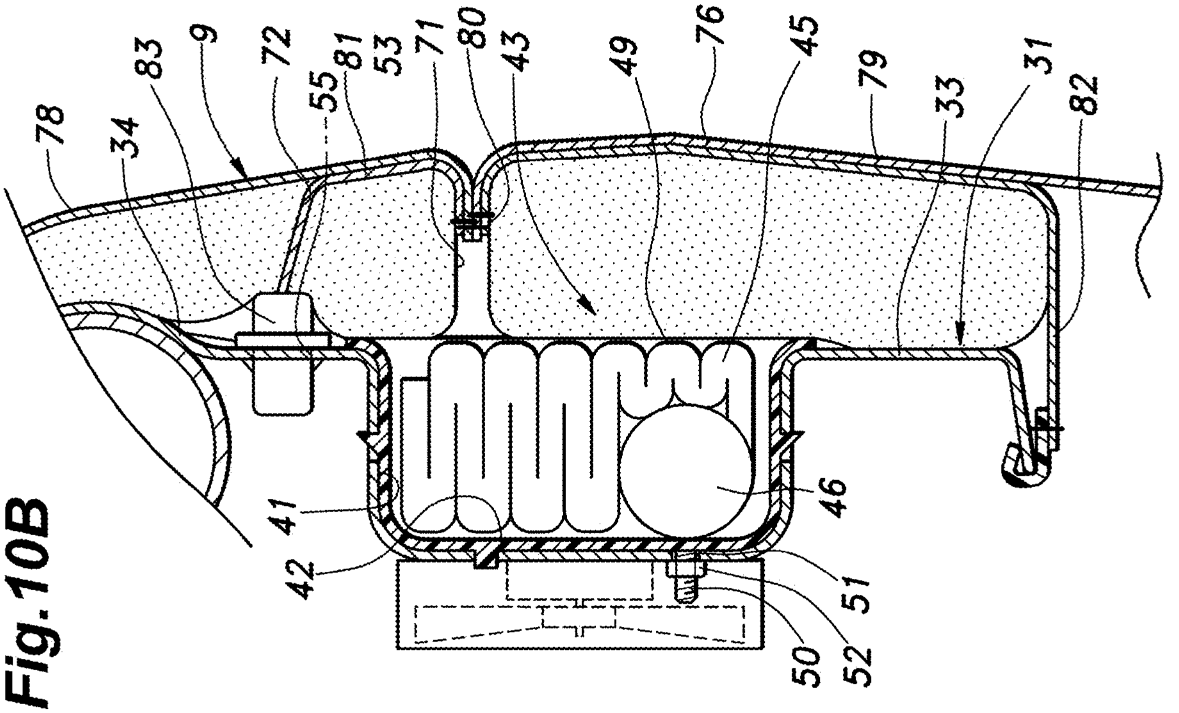
FIG. 10B is a sectional view of a vehicle seat according to another embodiment, in which a retainer and lid are omitted.
Figure 10A:
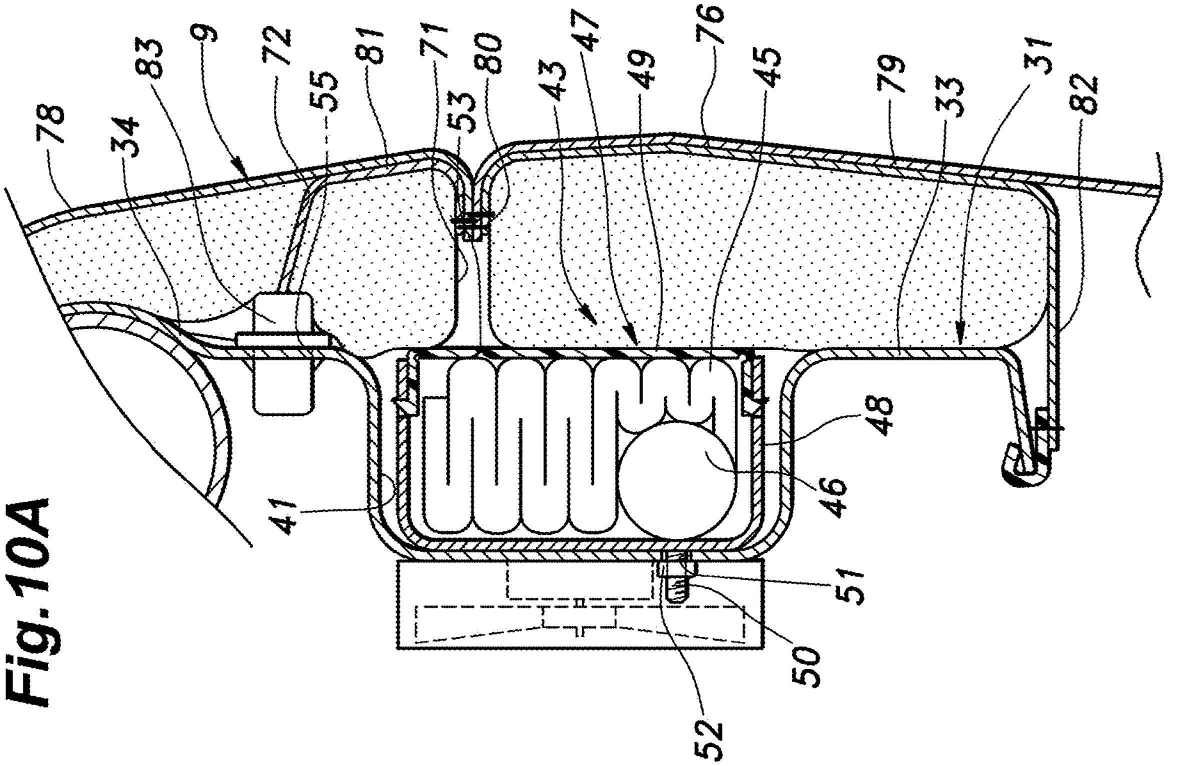
FIG. 10A is a sectional view of a vehicle seat according to another embodiment, in which an outer case is omitted.

Also, in the above embodiments, the outer case 40 was provided in the recess 41 but, as shown in FIG. 10A, it is also possible to prevent damage to the airbag 45 at the time of inflation by enlarging the curvature of the opening edge 130 of the recess 41. Further, as shown in FIG. 10B, it is possible to fit the outer case 40 in the recess 41 and to house the airbag 45 and the inflator 46 in the housing recess 40R of the outer case 40.

Glossary

1: vehicle seat
3: seat cushion
4: seat back
7: seat back frame
8: pad member
9: skin member
11: side frame
12: upper frame
17: pressure receiving member
28: pillar (headrest pillar)
31: bracket
34: upper tongue
35: lower tongue
36: rim wall
41: recess
42: recess bottom wall
43: airbag module
44: upper wall (guide wall)
45: airbag
41: recess
42: recess bottom wall
53: groove (deployment port)
55: mounting hole (engagement portion)
56: blower
50: male threaded portion (fastener)
51: through-hole
55: mounting hole
71: first slit
72: second slit
80: seam (frangible portion)
81: first stay cloth
82: second stay cloth
83: clip (engaged member)
84: hook (hooking member)
96: recess lower wall

The invention claimed is:

1. A vehicle seat provided with a seat cushion and a seat back, wherein the seat back comprises:
- a seat back frame including a pair of left and right side frames extending in a vertical direction and an upper frame connecting upper ends of the side frames to each other;
- an airbag module supported to an upper half of the seat back frame via a bracket; and
- a skin member covering the seat back frame, the bracket, and the airbag module from a rear side thereof;
- wherein:
  - a part of the skin member corresponding to the airbag module is provided with a frangible portion configured to open upon inflation of an airbag;
  - the bracket is joined to the upper frame;
  - the bracket defines a housing portion for housing the airbag module;
  - the airbag module includes the airbag, an inflator configured to inflate the airbag causing the airbag to protrude from the back of the seat back and deploy rearward and obliquely upward;
  - the inflator is positioned to partially overlap the upper frame in a vertical direction; and
  - a front end of the inflator is fixed to the bracket so as to be located behind a front end of the upper frame.

2. The vehicle seat according to claim 1, wherein the bracket is joined to the seat back frame at a pair of left and right upper tongue provided at upper edges of the bracket, and at a pair of left and right lower tongues provided at lower parts of the bracket.

3. The vehicle seat according to claim 1, wherein the bracket is joined to left and right side frames at left and right edges, respectively.

4. The vehicle seat according to claim 1, wherein the bracket is provided with a least one deformable portion that deforms during airbag inflation to absorb the load.

5. The vehicle seat according to claim 4, wherein the bracket is bent forward at the deformable portion.

6. The vehicle seat according to claim 4, wherein the housing portion consists of a recess that is recessed forward,
- the recess is defined by a bottom wall having a flat plate-like shape and side walls surrounding the recess bottom wall, and
- at least one of side walls includes a part located below the airbag.

7. The vehicle seat according to claim 6, wherein the bracket is provided with two of the deformable portions, one of which is located to the left of the recess and the other to the right of the recess.

8. The vehicle seat according to claim 1, further comprising a headrest provided on an upper part of the seat back,
- wherein the headrest includes a headrest main body and a pair of left and right pillars projecting from the headrest main body;
- wherein a pair of left and right pillar support members each formed in a tubular shape are fixed to the seat back frame;

wherein the pillars are inserted into and engaged with the respective pillar support members so that the headrest is fixed to the seat back frame; and wherein both of the pillar support members are located forward of a rear end of the bracket.

9. The vehicle seat according to claim 8, wherein both of the pillar support members overlap the bracket in the left-right direction in a front view.

10. The vehicle seat according to claim 1, comprising a headrest provided on an upper part of the seat back, wherein the seat back includes a pad member partially covered by the skin member.

11. A method for manufacturing a vehicle seat, the vehicle seat comprising a seat cushion and a seat back, the method comprising the steps of:

providing a seat back frame including a pair of left and right side frames extending in a vertical direction and an upper frame connecting upper ends of the side frames to one another;

joining a bracket defining a housing portion for accommodating an airbag module to the upper frame, the airbag module being configured to protrude from a rear face of the seat back and deploy rearward and obliquely upward;

accommodating the airbag module in the housing portion so as to be attached to an upper half of the seat back frame via the bracket; and covering the seat back frame, the bracket, and the airbag module from a rear side with a skin member having a frangible portion configured to open upon inflation of the airbag, wherein, when accommodating the airbag module in the housing portion, an inflator of the airbag module is positioned to partially overlap the upper frame in a vertical direction; and a front end of the inflator is fixed to the bracket so as to be located rearward of a front end of the upper frame.

12. The method for manufacturing a vehicle seat according to claim 11, wherein the joining of the bracket to the upper frame is performed by connecting a pair of left and right upper tongues provided at upper edges of the bracket to the seat back frame, and connecting a pair of left and right lower tongues provided at lower parts of the bracket to the seat back frame.

13. The method for manufacturing a vehicle seat according to claim 11, wherein the joining of the bracket to the upper frame is performed by connecting left and right edges of the bracket to left and right side frames, respectively.

14. The method for manufacturing a vehicle seat according to claim 11, wherein the bracket is provided with at least one deformable portion that deforms during the airbag inflation to absorb the load.

15. The method for manufacturing a vehicle seat according to claim 14, wherein the bracket is bent forward at the deformable portion.

16. The method for manufacturing a vehicle seat according to claim 11, wherein the housing portion consists of a recess that is recessed forward, the recess is defined by a bottom wall having a flat plate-like shape and side walls surrounding the recess bottom wall, and at least one of side walls includes a part located below the airbag.

17. The method for manufacturing a vehicle seat according to claim 16, wherein the bracket is provided with two deformable portions, one of which is located to the left of the recess and the other to the right of the recess.

18. The method for manufacturing a vehicle seat according to claim 11, further comprising the steps of:

providing a headrest, the headrest including a headrest main body and a pair of left and right pillars projecting from the headrest main body;

fixing a pair of left and right pillar support members, each formed in a tubular shape, to the seat back frame; and inserting the pair of left and right pillars into and engaging them with the respective pillar support members, so that the headrest is fixed to the seat back frame.

19. The method for manufacturing a vehicle seat according to claim 18, wherein the fixing of the pillar support members to the seat back frame is performed such that both of the pillar support members are positioned so as to overlap the bracket in the left-right direction in a front view.

20. The method for manufacturing a vehicle seat according to claim 11, further comprising the steps of:

providing a pad member to the seat back frame; and covering the pad member partially by the skin member.

* * * * *